United States Patent [19]
Ishiguro et al.

[11] Patent Number: 5,640,616
[45] Date of Patent: Jun. 17, 1997

[54] DRIVE CONTROL APPARATUS OF LENS HOUSING FOR CAMERA

[75] Inventors: Minoru Ishiguro; Jun'ichi Iwamoto, both of Saitama-ken, Japan

[73] Assignee: Fuji Photo Optical Co., Ltd., Saitama-ken, Japan

[21] Appl. No.: 547,669

[22] Filed: Oct. 19, 1995

[30] Foreign Application Priority Data

Oct. 20, 1994 [JP] Japan ..................................... 6-255449

[51] Int. Cl.$^6$ ...................................................... G03B 1/18
[52] U.S. Cl. ...................................................... 396/86; 396/87
[58] Field of Search ................................. 354/187, 195.1, 354/195.12; 396/72, 85, 86, 87, 348, 349

[56] References Cited

U.S. PATENT DOCUMENTS 4,864,338  9/1989  Wakabayashi ........................... 354/187
5,255,035  10/1993  Kichima ............................... 354/195.12
5,486,888  1/1996  Shiina et al. ........................... 354/187

FOREIGN PATENT DOCUMENTS 4-7526  4/1992  Japan.

*Primary Examiner*—Howard B. Blankenship
*Attorney, Agent, or Firm*—Leydig, Voit & Mayer

[57] ABSTRACT

A drive control apparatus of lens housing for camera, comprises a camera body, a lens housing, a drive unit, signal generating means and a control unit. The position detection of the lens housing is carried out only at a single reference position, and in each processing for moving the lens housing, the control for moving the lens housing to a first, second or third position is carried out based upon this single reference position after the lens housing is once moved to the reference position to execute position detection. According to the drive control apparatus of the present invention, it is possible to achieve a possibility of occurrence of detection error which is lower than those with conventional one requiring the position detection at at least three positions.

7 Claims, 10 Drawing Sheets

DRIVE CONTROL APPARATUS OF LENS HOUSING FOR CAMERA

BACKGROUND OF THE INVENTION

1. Field of the Invention

The present invention relates to a drive control apparatus of lens housing for camera, and more particularly to a drive control apparatus that can move a lens housing for camera with good accuracy and in simple structure.

2. Related Background Art

A conventional drive control apparatus of lens housing, which is arranged to retract the lens housing in the camera body when a camera is not used and to project a part of the lens housing from the camera body when the camera is used to take a picture, is described in, e.g., Japanese Patent Application Laid-open Gazette No. 4-7526.

Such a conventional drive control apparatus of lens housing of this type is provided with one electrode for detecting whether the lens housing is located at a position where the lens housing is completely retracted in the camera body, another electrode for detecting whether the lens housing is located at a position where the lens housing is projected, and a contact member capable of making contact with the two electrodes, and is arranged to perform control as detecting the position of the lens housing, based on detection signals obtained through these members.

SUMMARY OF THE INVENTION

The present inventors, however, found that such a conventional drive control apparatus of lens housing included the following problem.

Specifically, such a conventional drive control apparatus of lens housing needed to have separate electrodes corresponding to positions of lens housing to be detected. If there were a plurality of projecting positions of lens housing (for example, a standard shot position and a telephoto shot position), at least three electrodes were necessary for a position detector and the level of detection signal was switched at timings when the contact member passes at least three edges of the electrodes. Thus, the contact member must be always kept in sufficient contact with each electrode in order to accurately detect the position of lens housing in such a drive control apparatus. Particularly, the contact member must come into contact with and leave the at least three edges at accurate positions.

However, long-term repetition of sliding of the contact member gradually wore the tip of the contact member to make contact inadequate between each electrode and the contact member, which sometimes caused the tip of the contact member to come into contact with or leave each edge at an inaccurate position. Once such an event occurred even at one of the at least three edges, the apparatus failed to accurately move the lens housing, thus raising a problem of taking blurred pictures.

The present invention has solved the above problem, and an object of the invention is to provide a drive control apparatus of lens housing for camera that can always move the lens housing to accurate positions even after long-term repetition of movement of the lens housing where there are a plurality of projecting positions of the lens housing (for example, a standby position and a focusing position).

A drive control apparatus of lens housing for camera according to the present invention comprises:

a camera body having a front panel in which an aperture is formed;

a lens housing comprising lenses or a lens, at least a part of the lens housing being disposed in the aperture;

a drive unit for moving the lens housing between a first position where the lens housing is substantially retracted inside the camera body, a second position where a front face of the lens housing is projected out of the camera body, and a third position where the front face of the lens housing is further projected more from the second position out of the camera body;

signal generating means for outputting a signal based upon a single reference position; and a control unit connected to the drive unit and the signal generating means.

The above control unit according to the present invention drives the drive unit in the following manner. Namely, the control unit drives the drive unit in such a manner that the lens housing is moved among the first, second and third positions based upon the signal which is output by the signal generating means based upon the single reference position.

The control unit according to the present invention preferably drives the drive unit in such a manner that the lens housing is moved from one position among the first, second and third positions to the single reference position based upon the signal, and then the lens housing is further moved from the single reference position to another position among the first, second and third positions by a predetermined distance of from the single reference position to the another position.

In this case, the above control unit preferably drive the drive unit in such a manner that the lens housing is moved from the one position to the single reference position by dc control, and then the lens housing is further moved from the single reference position to the another position by pulse control.

The single reference position may be defined at a predetermined position between the first position and the third position, preferably between the second position and the third position.

In the drive control apparatus of the invention, the signal generating means may output one signal which holds a first level when the lens housing is located on a side of the first position with respect to the single reference position and another signal which holds a second level when the lens housing is located on a side of the third position with respect to the single reference position. In this case, it is preferable that the above control unit according to the present invention drives the drive unit in the following manner.

Namely, the control unit drives the drive unit in such a manner that in moving the lens housing from the first position to the second position (or in first projecting processing), the lens housing is moved in a projecting direction until the signal of the first level is switched to the signal of the second level, the lens housing is further moved by a predetermined distance in the projecting direction, the lens housing is further moved in a returning direction (retracting direction) until the signal of the second level is switched to the signal of the first level, and the lens housing is further moved in the returning direction by a distance of from the reference position to the second position.

Also, the control unit drives the drive unit in such a manner that in moving the lens housing from the second position to the third position (or in second projecting processing), the lens housing is moved in the projecting direction until the signal of the first level is switched to the signal of the second level, and the lens housing is further moved in the projecting direction by a distance of from the reference position to the third position.

Further, the control unit dives the drive unit in such a manner that in moving the lens housing from the third position to the second position (or in first returning (retracting) processing), the lens housing is moved in the returning direction until the signal of the second level is switched to the signal of the first level, and the lens housing is further moved in the returning direction by the distance of from the reference position to the second position.

Yet further, the control unit drives the drive unit in such a manner that in moving the lens housing from the second position to the first position (or in second returning (retracting) processing), the lens housing is moved in the projecting direction until the signal of the first level is switched to the signal of the second level, the lens housing is further moved by a predetermined distance in the projecting direction, the lens housing is further moved in the returning direction until the signal of the second level is switched to the signal of the first level, and the lens housing is moved in the returning direction by a distance of from the reference position to the first position.

Preferably, the above drive unit according to the present invention moves the lens housing at a first velocity before the level of the signal is switched, and moves the lens housing at a second velocity lower than the first velocity after the level of the signal is switched.

In the above drive control apparatus of the present invention, the camera body further comprises a camera power-supply switch and a shutter release button, and the power-supply switch and shutter release button are connected to the control unit. In this case, the control unit preferably drives the drive unit in such a manner that when the power-supply switch is in an off state, the lens housing is located at the first position (retracted position), that when the power-supply switch is in an on state and when the shutter release button is in a standby state in which the shutter release button is not depressed, the lens housing is located at the second position (standby position), and that when the power-supply switch is in the on state and when the shutter release button is in a photographing state in which the shutter release button is depressed, the lens housing is located at the third position (focusing position).

In the drive control apparatus of lens housing for camera according to the present invention, the signal generating means generates a signal (state signal) which changes the state depending upon a positional relation of the lens housing relative to one (single) reference position (preferably one signal which holds the first level when the lens housing is located on the side of the first position with respect to the single reference position and another signal which holds the second level when the lens housing is located on the side of the third position with respect to the single reference position). The control unit executes the control of movement of the lens housing, based on only this signal. Thus, the position detection of lens housing is carried out only at the single reference position, and the control unit and drive unit (moving means) perform such a control that after the lens housing is once moved to the reference position to perform position detection, the lens housing is moved to the first, second, or third position with this reference position as the reference.

This arrangement to perform the control of lens housing based on the position detection of lens housing at the single reference position in this manner decreases a possibility of occurrence of position detection error of lens housing, as compared with the conventional drive control apparatus requiring position detection at at least three positions. Accordingly, the drive control apparatus of lens housing for camera according to the present invention can fully prevent occurrence of faulty positioning of the lens housing caused by the above detection error, whereby the lens housing can be always moved to accurate positions throughout a long period.

Here, for moving the lens housing, for example, to the second position after the lens housing is moved to the reference position, the lens housing needs to be accurately moved by the distance between the reference position and the second position. For this purpose, this movement processing is preferably performed at the second velocity, which is low (preferably by pulse control). In contrast with it, for moving the lens housing to the reference position, it is necessary only to move the lens housing, based on only the above-mentioned signal, but control as to the distance is not necessary. Thus, the movement can be performed at the first velocity higher than the second velocity (preferably by dc control).

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Embodiments of the present invention will be explained with reference to the accompanying drawings.

The present invention is directed to the drive control apparatus of lens housing for camera.

Figure 1:
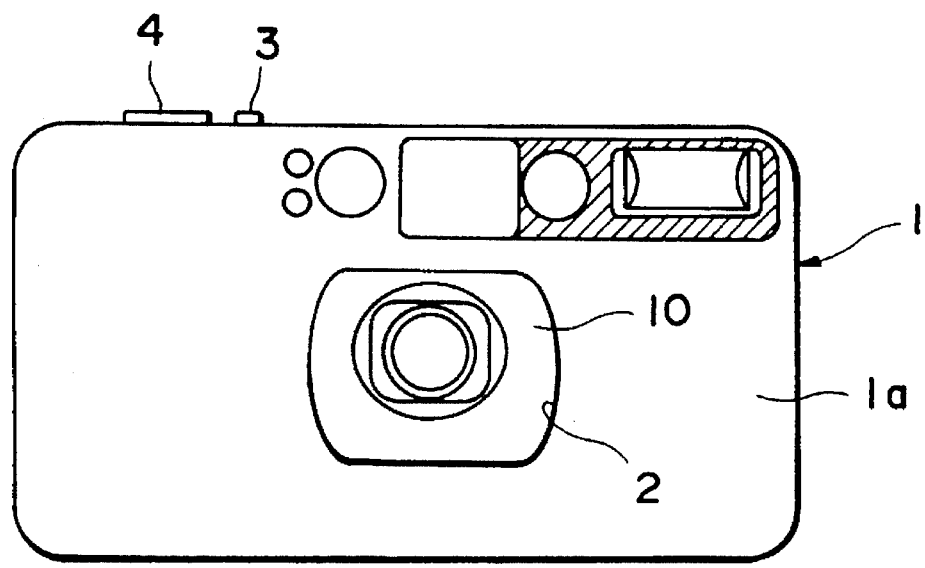
FIG. 1 is a front view to show an example of a camera provided with the drive control apparatus of the present invention.

FIG. 1 is a front view to show an example of a camera provided with the drive control apparatus of the present embodiment. In the camera, a front panel 1a of a camera body 1 has an aperture 2, and a camera power-supply switch 3, a shutter release button 4, etc. are arranged in the camera body 1. A lens housing 10 is set in the aperture 2.

Figure 2:
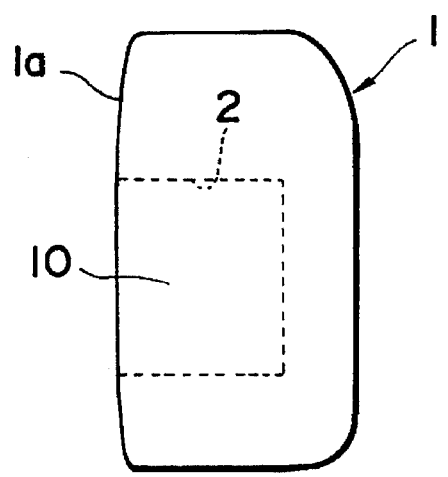
FIG. 2 is a side view of the camera in which the lens housing is located at a first position.
Figure 3:
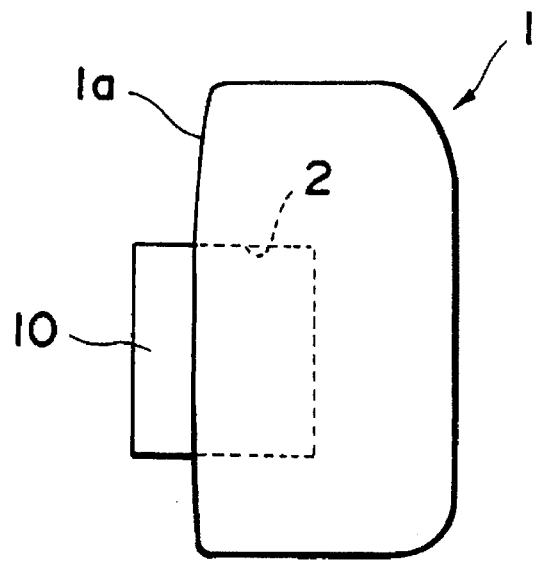
FIG. 3 is a side view of the camera in which the lens housing is located at a second position.
Figure 4:
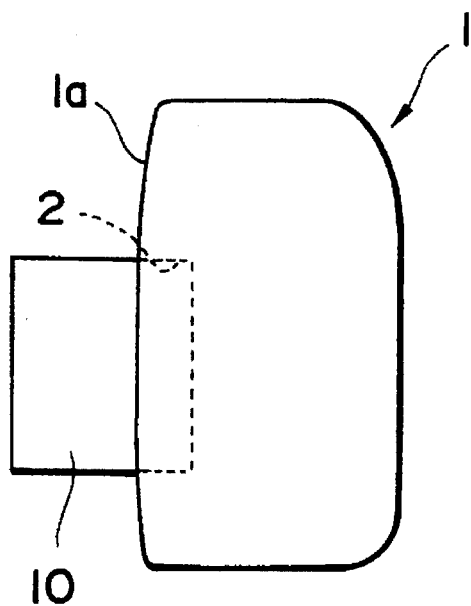
FIG. 4 is a side view of the camera in which the lens housing is located at a third position.

The drive control apparatus of lens housing of the present embodiment is so arranged that the lens housing 10 is retracted (at a first position or retracted position) in the camera body 1 when the camera is not used (or when the power-supply switch 3 is off), that the lens housing 10 is projected up to a second position (standby position) when the camera power supply is active (or when the power-supply switch 3 is on), and that the lens housing 10 is projected to a third position (focusing position) when the shutter release button 4 is depressed in addition. FIG. 2, FIG. 3, and FIG. 4 are side views of the camera when the lens housing 10 is located at the first position, at the second position, and at the third position, respectively.

Figure 5:
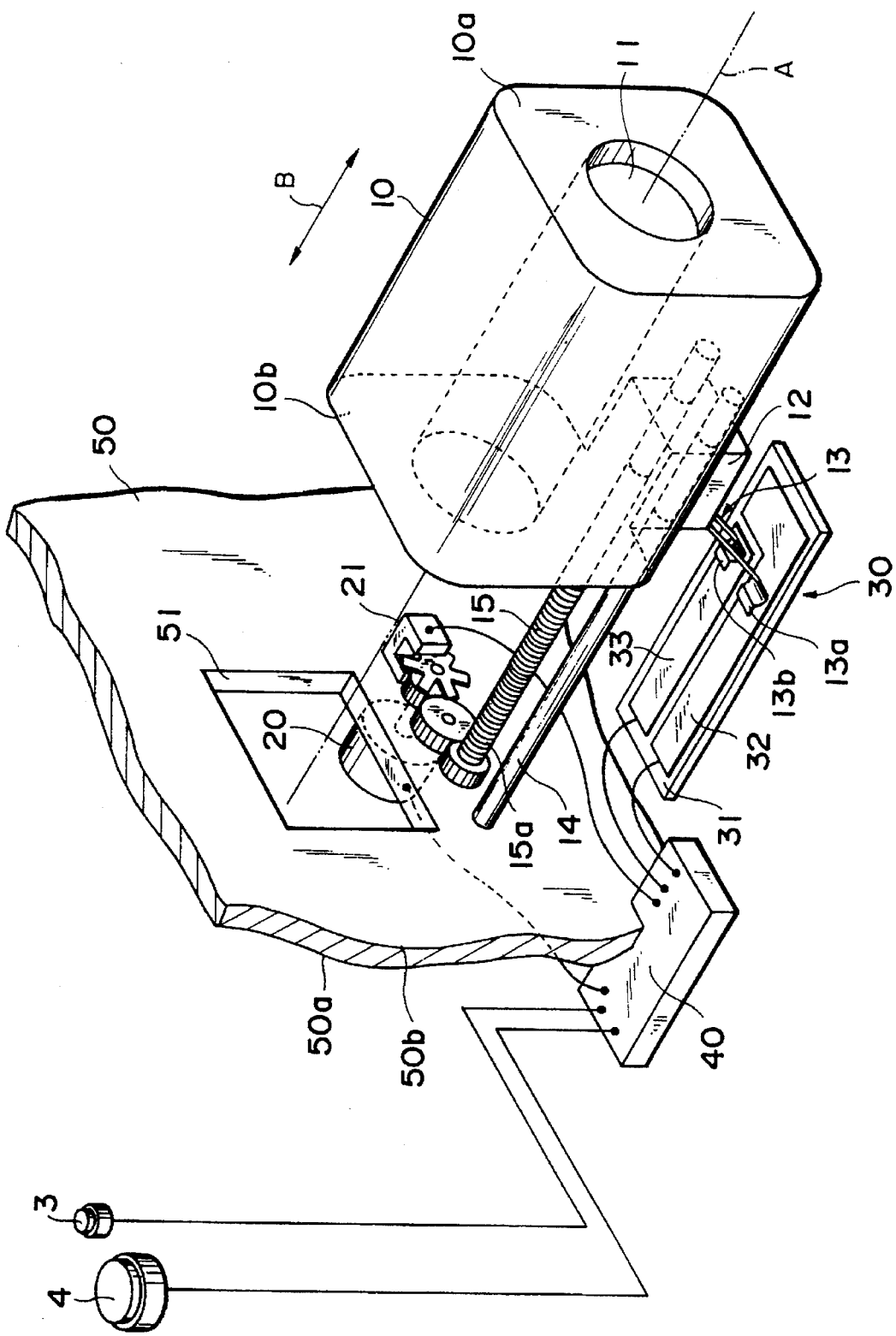
FIG. 5 is a perspective view to show the structure of an example of the drive control apparatus of lens housing for camera according to the present invention.

FIG. 5 is a perspective view to show the structure of the drive control apparatus of lens housing for camera according to the present embodiment. Referring to FIG. 5, the drive control apparatus of the present embodiment is provided with a motor (drive unit) 20 for moving the lens housing 10 back and forth along the direction of the optical axis A, a position detector (signal generating means) 30 for detecting the position of the lens housing, and a control circuit (control unit) 40 for controlling movement of the lens housing 10, based on detection signals from the position detector 30.

The lens housing 10 is substantially of a parallelepiped shape, in which a circular hole is formed from a front face 10a thereof to a rear face 10b which is opposite to the front face 10a. Lenses (lens system) 11 are set in this hole. A square projection 12 is provided on the bottom face of the lens housing 10, and a brush 13 is mounted on the bottom face of the projection 12. Two metal contact members 13a, 13b with curved tip portions are so fixed to the brush 13 as to be directed obliquely downward, and the contract members 13a, 13b are electrically connected with each other at their roots.

The position detector 30 is so arranged that the top face thereof is coincident with loci in which the tip portions of the contact members 13a, 13b move with movement of the lens housing 10. The position detector 30 is composed of an encoder printed board 31 the longitudinal direction of which is set to be coincident with the direction of the optical axis A of lens 11, and electrodes 32, 33 formed on the top surface of the encoder printed board 31 and located on the respective loci in which the tip portions of the contact members 13a, 13b move. This arrangement of the electrodes 32, 33 causes the tips of the brush 13 moving with the lens housing 10 to slide on the electrodes 32, 33, and changes the potential of electrode 33 with movement of lens housing 10. A change in the potential of electrode 33 is supplied as a detection signal SLHP to the control circuit 40.

A guide plate 50 for guiding a film is placed in parallel with the back face 10b of lens housing 10 and as opposed thereto, and the film (not shown) is loaded for taking pictures on the back face 50a (which is a surface opposite to the surface 50b opposed to the rear face 10b) of the guide plate 50. The guide plate 50 has a square aperture frame 51 to permit an image of the subject to be formed on the film through the lens housing 10. Between the guide plate 50 and the front panel 1a of the camera body, a guide bar 14 and a rod feed screw 15 extending along the direction of the optical axis A of lens 11 are mounted in parallel. A motor 20 functioning to rotate the feed screw 15 is attached to the feed screw 15 on the side of guide plate 50. The guide bar 14 and feed screw 15 are engaged with the projection 12 of lens housing 10, and when the feed screw 15 is rotated through drive of motor 20 receiving a control signal from the control circuit 40, the lens housing 10 moves back and forth along the guide bar 14 (along the double headed arrow B in FIG. 5). A photointerrupter 21 attached to the motor 20 counts an amount of movement of the lens housing 10 and supplies it to the control circuit 40. Further, the camera power-supply switch 3, shutter release button 4, etc. are electrically connected to the control circuit 40.

Figure 6:
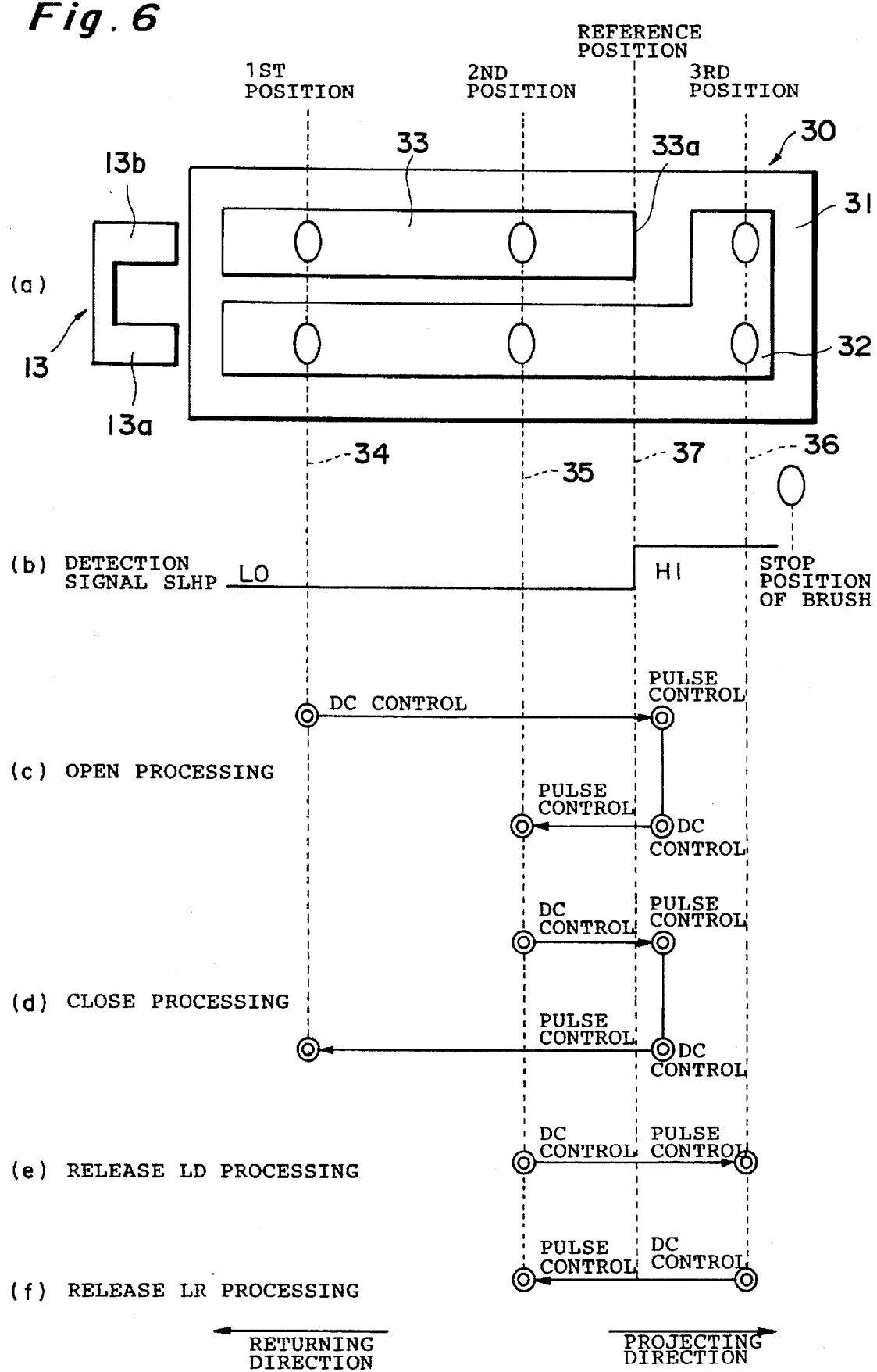
FIG. 6 is a chart to show relations among the configuration of an example of a position detector in (a), a detection signal SLHP in (b), and loci of a brush (contact member) according to control processing of movement of lens housing in (c) to (f)

FIG. 6 (a) shows the structure of the position detector 30. The position detector 30 has the L-shaped pattern electrode 32 and rectangular pattern electrode 33 located on the top face of the encoder printed board 31. The electrode 32 is arranged along the locus of the tip portion of the contact member 13a in the brush 13, so that the tip portion of the contact member 13a may be always kept in contact with the electrode 32. On the other hand, the electrode 33 is arranged along the locus of the tip portion of the contact member 13b in the brush 13, so that the tip portion of the contact member 13b may be in contact with the electrode 33. The brush 13 is located at a first position 34 when the lens housing 10 is retracted in the camera body, is located at a second position 35 when the camera power-supply switch 3 is turned on, and is located at a third position 36 when the shutter release button 4 is depressed.

Here, the electrode 33 is formed as ranging from the first position 34 up to a predetermined position 37 between the second position 35 and the third position 36, and a position of an edge 33a of the electrode 33 becomes the reference position 37.

The electrode 32 is connected to a ground potential line, while the electrode 33 to a power-supply potential line through a resistor. Further, the contact member 13a and contact member 13b in the brush 13 are electrically connected to each other. Thus, while the brush 13 is located at the first position 34 or the second position 35, the contact member 13a in the brush 13 is in contact with the electrode 32 and the contact member 13b in the brush 13 is in contact with the electrode 33. Therefore, the electrode 32 and electrode 33 are kept at the same potential through the brush 13, so that the electrode 33 keeps the ground potential (low level).

After that, when the shutter release button 4 is depressed, the brush 13 moves from the second position 35 to the third position 36 with movement of the lens housing 10. When the brush 13 reaches the reference position 37, the tip portion of the contact member 13b in the brush 13 is to leave the electrode 33, whereby the electrode 33 comes to have the power-supply potential (high level). Accordingly, the potential of the electrode 33 is switched from the low level to the high level at the reference position 37, and this potential change is output as a detection signal SLHP shown in FIG. 6 (b) from the electrode 33.

Figure 7:
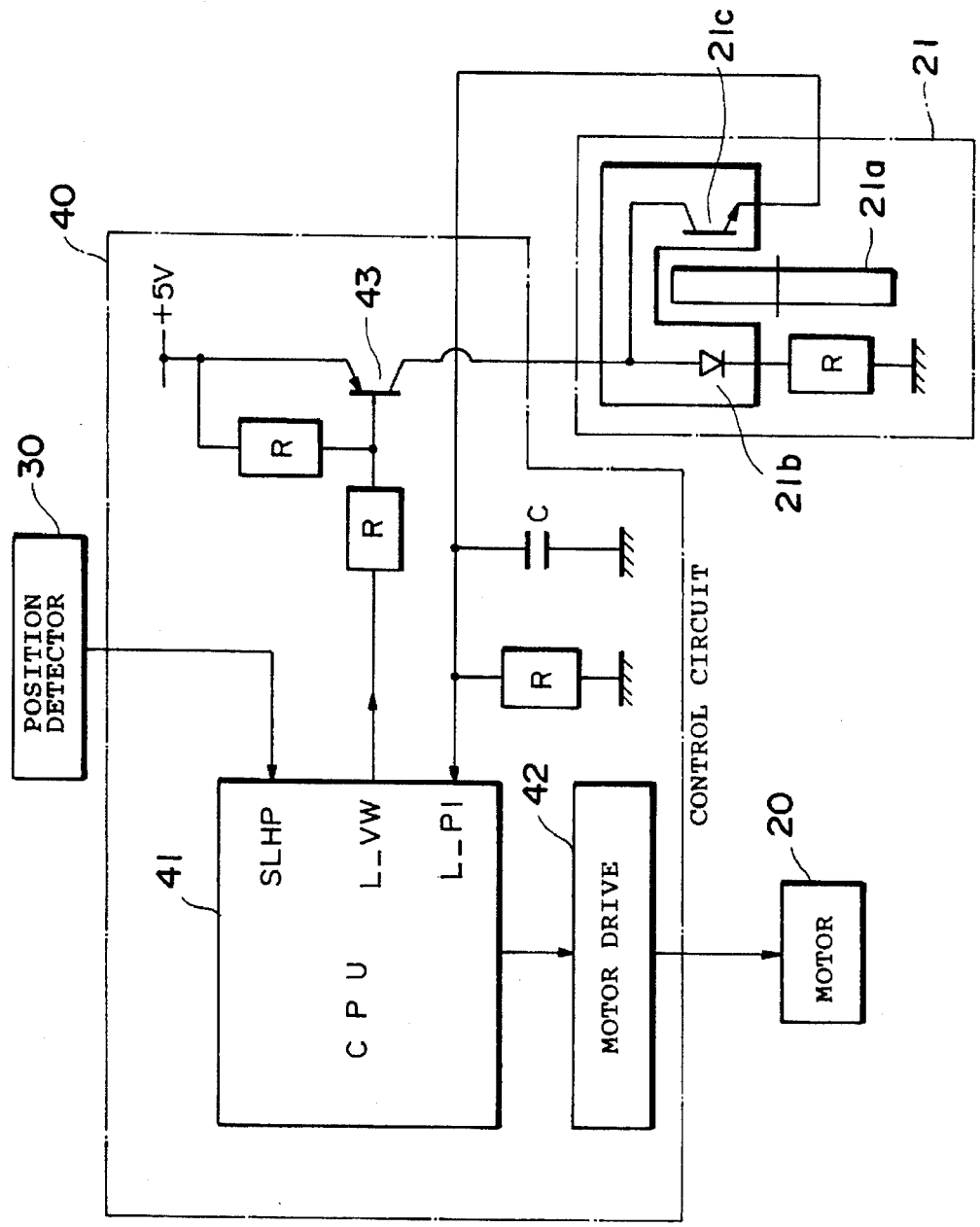
FIG. 7 is a circuit diagram to show the configuration of an example of a control circuit.

The structure of the control circuit 40 is next explained referring to the circuit diagram of FIG. 7. Referring to FIG. 7, the control circuit 40 has a CPU 41, and the detection signal SLHP from the position detector 30 and a signal L_PI from the photointerrupter 21 are supplied to the CPU 41. The CPU 41 outputs a control signal to a motor drive 42. The motor drive 42 drives the motor 20 under dc control at a normal speed or under pulse control at a low speed (a speed lower than the normal speed) in accordance with directions of the command signal. The CPU 41 has a built-in ROM, and the CPU 41 executes the control of movement of the lens housing 10, based on a control program written in the ROM.

The photointerrupter 21 is composed of a rotary plate 21a with notches connected to the rotary shaft of motor 20 and arranged to rotate according to drive of motor 20, and a light-emitting diode 21b and a phototransistor 21c arranged as opposed to each other on either side of the rotary plate 21a. The CPU 41 supplies a control signal L_VW through a transistor 43 to the light-emitting diode 21b and phototransistor 21c. When the control signal L_VW turns to the low level, the light-emitting diode 21b and phototransistor 21c turn active, whereby irradiation light from the light-emitting diode 21b comes to pass through the notches in the rotary plate 21a to reach the phototransistor 21c. Receiving the irradiation light from the light-emitting diode 21b, the phototransistor 21c outputs the detection signal L_PI and this detection signal L_PI is supplied to the CPU 41.

Next explained referring to FIG. 6 (c) to (f) is the control processing of movement of the lens housing 10 executed by the control circuit 40, based on the detection signal SLHP output from the position detector 30. FIG. 6 (c) to (f) show loci of the brush 13 moving with the lens housing 10.

In open processing for moving the lens housing 10 from the first position 34 to the second position 35, as shown in FIG. 6 (c), the motor 20 is first dc-driven while the detection signal SLHP is kept at the low level to move the lens housing 10 at normal speed in the projecting direction. At a timing when the detection signal SLHP changes from the low level to the high level, drive of motor 20 is switched to the pulse drive to move the lens housing 10 by a predetermined distance at low speed in the projecting direction. Further, the rotation of motor 20 is reversed to dc-drive the motor 20 while the detection signal SLHP is kept at the high level, thereby moving the lens housing 10 at normal speed in the returning direction. At a timing when the detection signal SLHP changes from the high level to the low level, the drive of motor 20 is switched to the pulse drive to move the lens housing 10 by a distance of from the reference position 37 to the second position 35 at low speed in the returning direction.

In close processing for moving the lens housing 10 from the second position 35 to the first position 34, as shown in FIG. 6 (d), the motor 20 is dc-driven while the detection signal SLHP is kept at the low level, thereby moving the lens housing 10 at normal speed in the projecting direction. At a timing when the detection signal SLHP changes from the low level to the high level, the drive of motor 20 is switched to the pulse drive to move the lens housing 10 by a predetermined distance at low speed in the projecting direction. Further, the rotation of motor 20 is reversed to dc-drive the motor 20 while the detection signal SLHP is kept at the high level, thereby moving the lens housing 10 at normal speed in the returning direction. At a timing when the detection signal SLHP changes from the high level to the low level, the drive of motor 20 is switched to the pulse drive to move the lens housing 10 by a distance of from the reference position 37 to the first position 34 at low speed in the returning direction.

In release LD processing for moving the lens housing 10 from the second position 35 to the third position 36, as shown in FIG. 6 (e), the motor 20 is first dc-driven while the detection signal SLHP is kept at the low level, thereby moving the lens housing 10 at normal speed in the projecting direction. At a timing when the detection signal SLHP changes from the low level to the high level, the drive of motor 20 is switched to the pulse drive to move the lens housing 10 by a distance of from the reference position 37 to the third position 36 at low speed in the projecting direction.

In release LR processing for moving the lens housing 10 from the third position 36 to the second position 35, as shown in FIG. 6 (f), the motor 20 is first dc-driven while the detection signal SLHP is kept at the high level, thereby moving the lens housing 10 at normal speed in the returning direction. At a timing when the detection signal SLHP changes from the high level to the low level, the drive of motor 20 is switched to the pulse drive to move the lens housing 10 by the distance of from the reference position 37 to the second position 35 at low speed in the returning direction.

The details of the control program for the above control processing will be next explained referring to the flowcharts in FIG. 8 to FIG. 12. This control program is written in the built-in ROM in the control circuit 40, as described previously.

The control program consists of a plurality of processing programs corresponding to the above open processing, close processing, release LD processing, and release LR processing.

Figure 8:
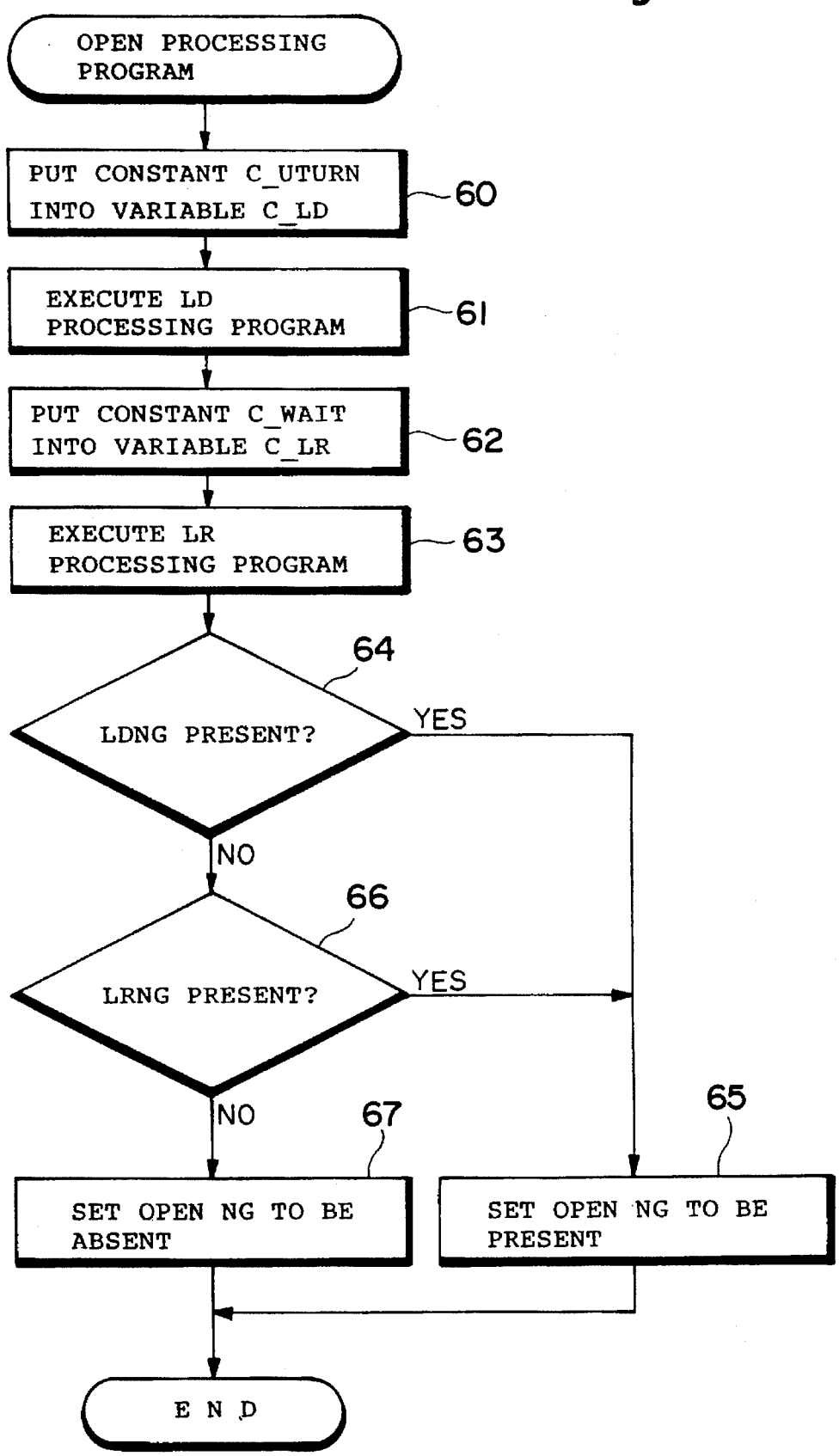
FIG. 8 is a flowchart to show a flow of processing of an open processing program.

The open processing program for executing the open processing is first explained referring to the flowchart of FIG. 8. Referring to FIG. 8, a constant C_UTURN is first put into a variable C_LD (step 60). The constant C_UTURN is a pulse number corresponding to a distance necessary to stop the lens housing 10 moving at normal speed. Then an LD processing program is executed to move the lens housing 10 in the projecting direction (step 61). Since the LD processing program is executed referencing the variable C_LD, the lens housing 10 stops at a position shifted by the constant C_UTURN from the reference position 37 to the side of third position 36. Next, a constant C_WAIT is put into a variable C_LR (step 62). The constant C_WAIT is a pulse number corresponding to the distance between the reference position 37 and the second position 35. Then an LR processing program is executed to move the lens housing 10 in the returning direction (step 63). Since the LR processing program is executed referencing the variable C_LR, the lens housing 10 stops at the second position 35.

The processor next checks an LDNG flag which is set to be "present" when the LD processing program is abnormally ended (step 64). If the LDNG flag is set to be "present", an open NG flag is set to be "present" (step 65). If the LDNG flag is not set to be "present", the processor checks an LRNG flag, which is set to be "present" when the LR processing program is abnormally ended (step 66). If the LRNG flag is set to be "present", the open NG flag is set to be "present" (step 65). If the LRNG flag is not set to be "present", the open NG flag is set to be "absent" (step 67), and then the processing is ended.

Figure 9:
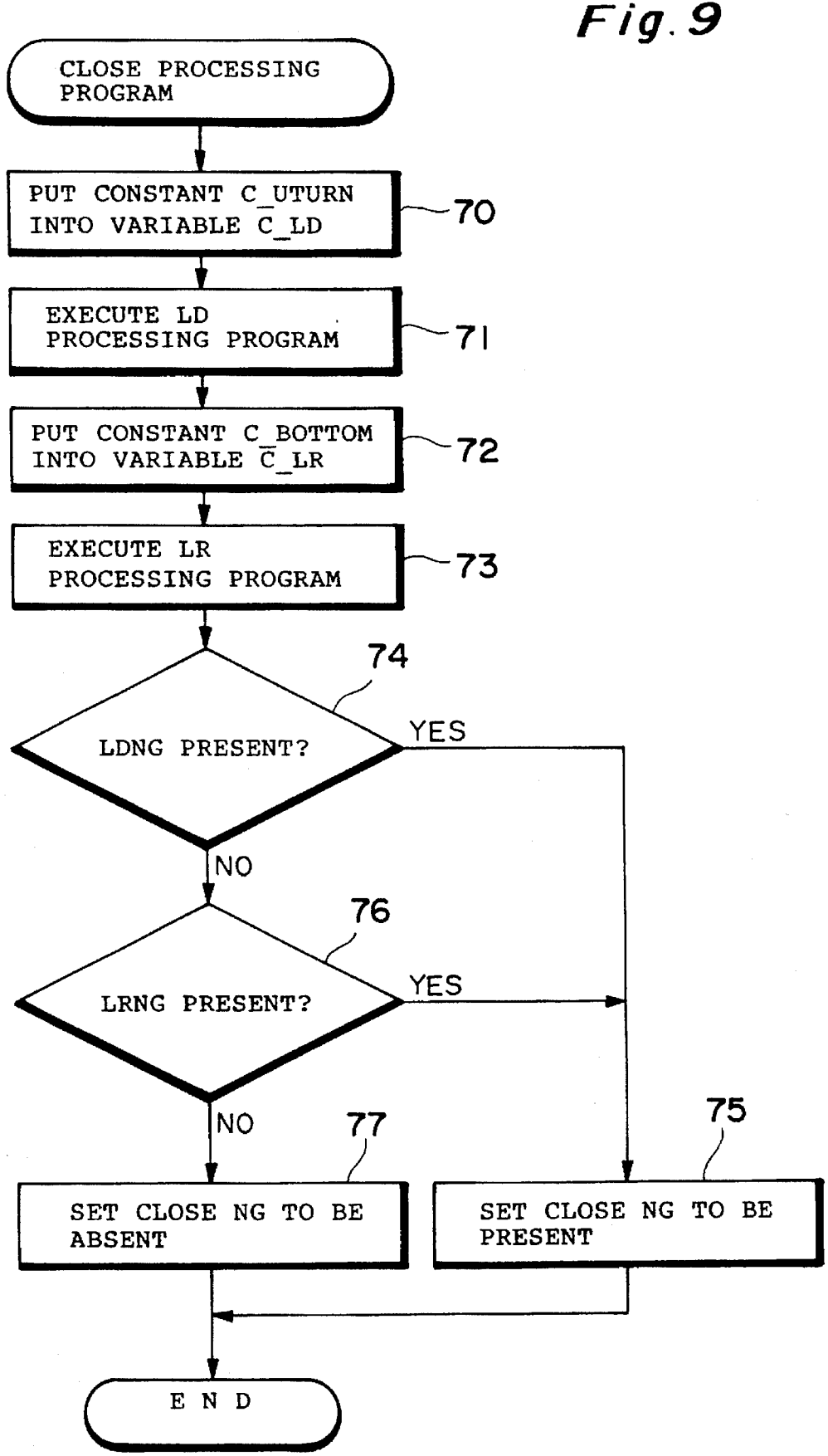
FIG. 9 is a flowchart to show a flow of processing of a close processing program.

The close processing program for executing the close processing is next explained referring to the flowchart of FIG. 9. Referring to FIG. 9, the constant C_UTURN is first put into the variable C_LD (step 70). The constant C_UTURN is a pulse number corresponding to the distance necessary to stop the lens housing 10 moving at normal speed. Then the LD processing program is executed to move the lens housing 10 in the projecting direction (step 71). Since the LD processing program is executed referencing the variable C_LD, the lens housing 10 stops at the position shifted by the constant C_UTURN from the reference position 37 to the side of third position 36. Next, a constant C_BOTTOM is put into the variable C_LR (step 72). The constant C_BOTTOM is a pulse number corresponding to the distance between the reference position 37 and the first position 34. Then the LR processing program is executed to move the lens housing 10 in the returning direction (step 73). Since the LR processing program is executed referencing the variable C_LR, the lens housing 10 stops at the first position 34.

The processor next checks the LDNG flag (step 74). If the LDNG flag is set to be "present", a close NG flag is set to be "present" (step 75). If the LDNG flag is not set to be "present", the processor checks the LRNG flag (step 76). If the LRNG flag is set to be "present", the close NG flag is set to be "present" (step 75). If the LRNG flag is not set to be "present", the close NG flag is set to be "absent" (step 77), and then the processing is ended.

Figure 10:
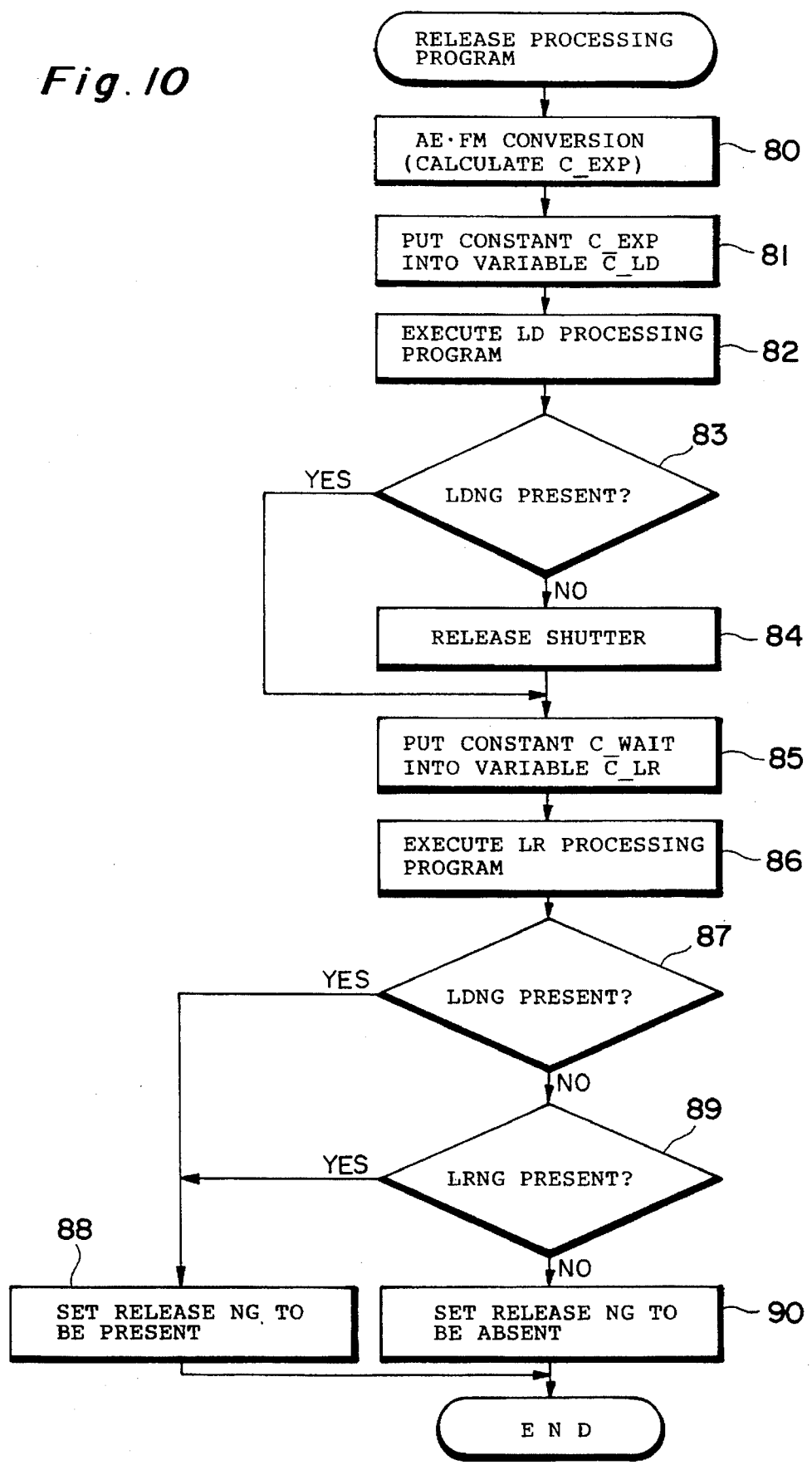
FIG. 10 is a flowchart to show a flow of processing of a release processing program.

The release processing program for executing the release processing is next explained referring to the flowchart of FIG. 10. In the release processing, the lens housing 10 is first projected from the second position 35 to the third position 36 in release LD processing (steps 81, 82), and after taking a picture at this position, the lens housing 10 is moved from the third position 36 to the second position 35 in release LR processing (steps 85, 86).

Specifically, AE and FM conversion processing is first executed to obtain EV value and AV value and to calculate a constant C_EXP, which is a pulse number corresponding to the distance between the reference position 37 and the third position 36 (step 80). Then the constant C_EXP is put into the variable C_LD (step 81), and the LD processing program is executed to move the lens housing 10 in the projecting direction (step 82). Since the LD processing program is executed referencing the variable C_LD, the lens housing 10 stops at the third position 36.

Next, the processor checks the LDNG flag (step 83). If the LDNG flag is not set to be "present", the shutter is released to take a picture (step 84). If the LDNG flag is set to be "present" or if shooting at step 84 is ended, the constant C_WAIT is put into the variable C_LR (step 85). The constant C_WAIT is a pulse number corresponding to the distance between the reference position 37 and the second position 35. Then the LR processing program is executed to move the lens housing 10 in the returning direction (step 86). Since the LR processing program is executed referencing the variable C_LR, the lens housing 10 stops at the second position 35.

The processor next checks the LDNG flag (step 87). If the LDNG flag is set to be "present", the release NG flag is set to be "present" (step 88). If the LDNG flag is not set to be "present", the processor checks the LRNG flag (step 89). If the LRNG flag is set to be "present", the release NG flag is set to be "present" (step 88). If the LRNG flag is not set to be "present", the release NG flag is set to be "absent" (step 90), and then the processing is ended.

Figure 11:
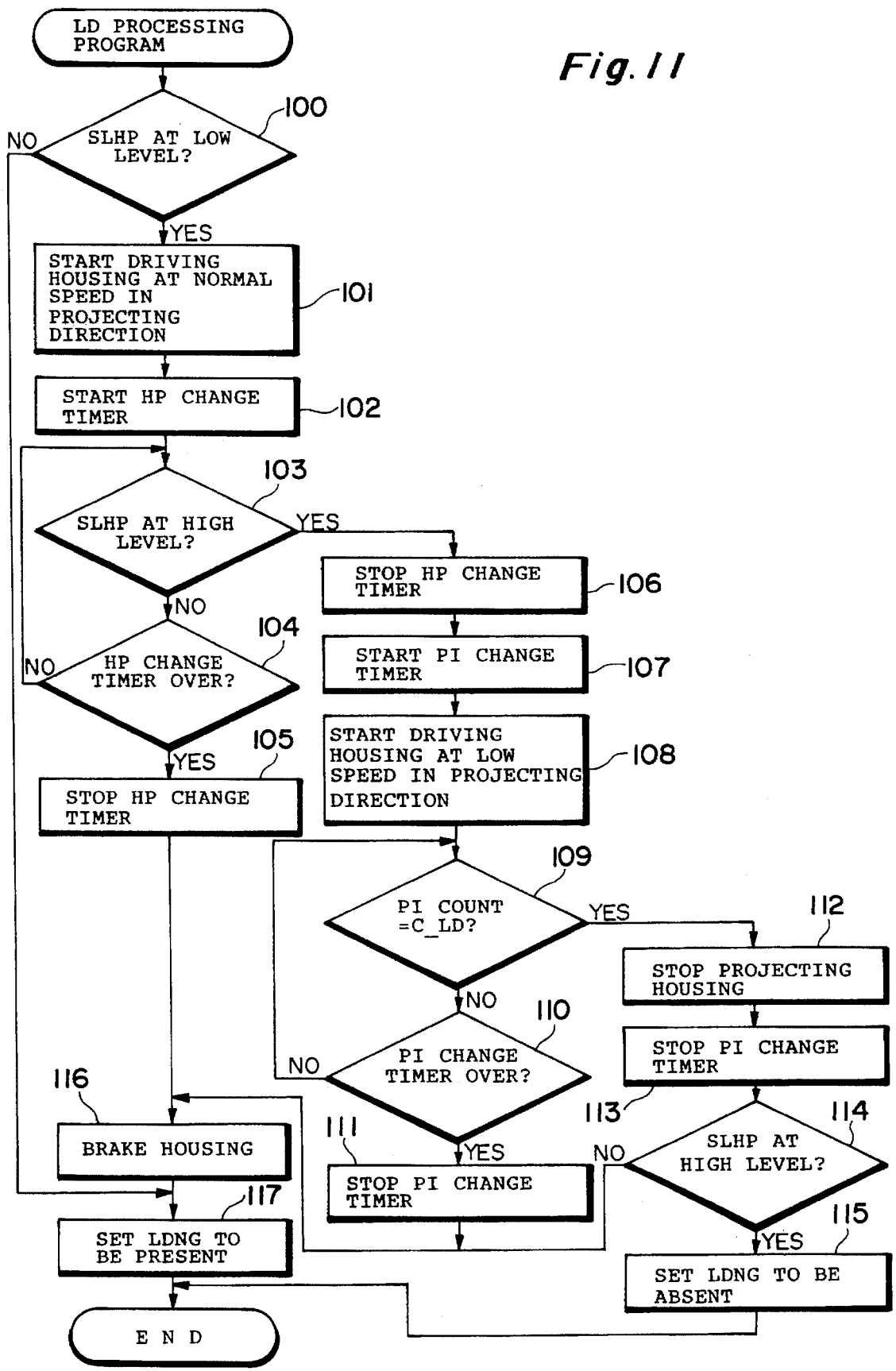
FIG. 11 is a flowchart to show a flow of processing of an LD (lens driving) processing program.

The LD processing program for moving the lens housing 10 in the projecting direction is next explained referring to the flowchart of FIG. 11. The processor first checks whether the detection signal SLHP is kept at the low level or not (step 100). If it is at the low level, the dc drive of motor 20 is started to move the lens housing 10 at normal speed in the projecting direction (step 101). Then an HP change timer is started (step 102). The HP change timer is one for preventing the lens housing 10 from moving more than necessary because of an abnormal condition of the detection signal SLHP.

Then the processor checks whether the detection signal SLHP is at the high level or not (step 103). If it is at the low level, the processor checks whether the HP change timer is over (step 104). If it is over, the HP change timer is stopped (step 105). If it is not over, the processing returns to step 103. By the loop of step 103 and step 104, the movement of the lens housing 10 in the projecting direction is continued before the detection signal SLHP changes to the high level.

Once the detection signal SLHP changes to the high level, the processing leaves the loop of step 103 and step 104 to stop the HP change timer (step 106). Then a PI change timer is started (step 107). The PI change timer is one for preventing the lens housing 10 from moving more than necessary because of an abnormal condition of the detection signal L_PI from the photointerrupter 21. Further, the pulse drive of motor 20 is started to move the lens housing 10 at low speed in the projecting direction (step 108).

The processor next checks whether a PI count value resulting from counting level changes of the detection signal L_PI reaches C_LD or not (step 109). If not, the processor checks whether the PI change timer is over (step 110). If it is over, the PI change timer is stopped (step 111). If it is not over, the processing returns to step 109. Then the movement of the lens housing 10 in the projecting direction is continued by the loop of step 109 and step 110 before the PI count value becomes C_LD.

Once the PI count value becomes C_LD, the processing leaves the loop of step 109 and step 110 to stop the lens housing 10 (step 112). Then the PI change timer is stopped (step 113), and the processor checks whether the detection signal SLHP is at the high level (step 114). If the detection signal SLHP is at the high level, the LDNG flag is set to be "absent" (step 115).

If the detection signal SLHP is at the low level at step 114, if the processing of step 105 is completed, or if the processing of step 111 is completed, the lens housing 10 is stopped (step 116). If this processing is completed or if the detection signal SLHP is at the high level at step 100, the LDNG flag is set to be "present" (step 117), and the processing is ended.

Figure 12:
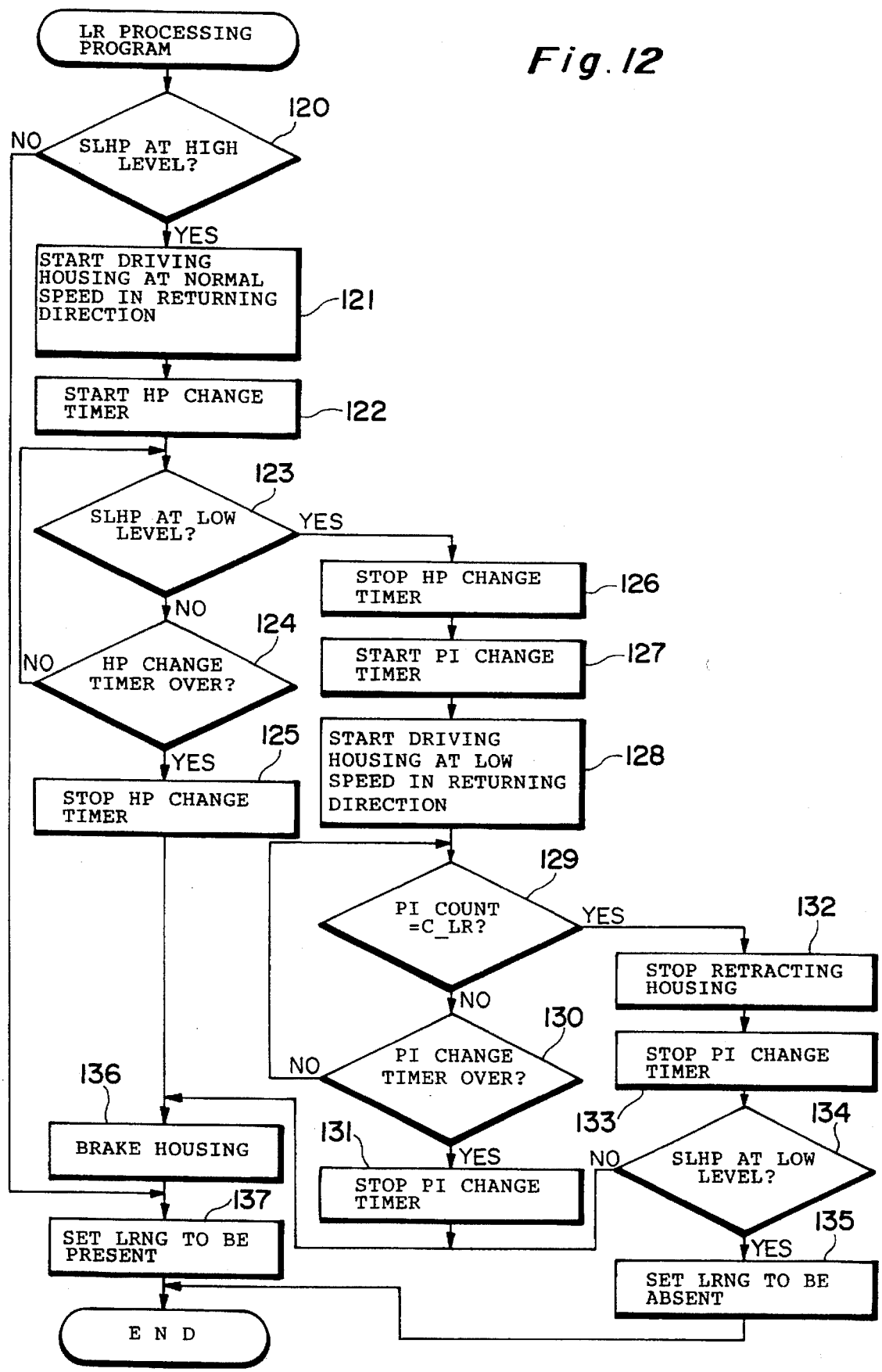
FIG. 12 is a flowchart to show a flow of processing of an LR (lens returning) processing program.

The LR processing program for moving the lens housing 10 in the returning direction is next explained referring to the flowchart of FIG. 12. The processor first checks whether the detection signal SLHP is at the high level or not (step 120). If it is at the high level, the dc drive of motor 20 is started to move the lens housing 10 at normal speed in the returning direction (step 121). Then the HP change timer is started (step 122). The HP change timer is one for preventing the lens housing 10 from moving more than necessary because of an abnormal condition of the detection signal SLHP.

The processor next checks whether the detection signal SLHP is at the low level (step 123). If it is at the high level, the processor checks whether the HP change timer is over (step 124). If it is over, the HP change timer is stopped (step 125). If it is not over, the processing returns to step 123. By the loop of step 123 and step 124 the movement of the lens housing 10 in the returning direction is continued before the detection signal SLHP changes to the low level.

Once the detection signal SLHP changes to the low level, the processing leaves the loop of step 123 and step 124 to stop the HP change timer (step 126). Then the PI change timer is started (step 127). The PI change timer is one for preventing the lens housing 10 from moving more than necessary because of an abnormal condition of the detection signal L_PI from the photointerrupter 21. Further, the pulse drive of motor 20 is started to move the lens housing 10 at low speed in the returning direction (step 128).

The processor next checks whether the PI count value resulting from counting level changes of the detection signal L_PI reaches C_LR or not (step 129). If not, the processor checks whether the PI change timer is over (step 130). If it is over, the PI change timer is stopped (step 131). If it is not over, the processing returns to step 129. By the loop of step 129 and step 130 the movement of the lens housing 10 in the returning direction is continued before the PI count value becomes C_LR.

Once the PI count value becomes C_LR, the processing leaves the loop of step 129 and step 130 to stop the lens housing 10 (step 132). Then the PI change timer is stopped (step 133) and the processor checks whether the detection signal SLHP is at the low level (step 134). If the detection signal SLHP is at the low level, the LRNG flag is set to be "absent" (step 135).

If the detection signal SLHP is at the high level at step 134, if the processing of step 125 is completed, or if the processing of step 131 is completed, the lens housing 10 is stopped (step 136). If this processing is completed or if the detection signal SLHP is at the low level at step 120, the LRNG flag is set to be "present" (step 137), and the processing is ended.

In the control processing as detailed above, the drive of motor 20 is switched from the dc drive at normal speed to the pulse drive at low speed when the lens housing 10 is about to be stopped. Should the motor 20 be stopped as kept in the dc drive at normal speed, a stop position of motor would deviate because of an inertial force. Such deviation will not occur in the movement control processing of the present embodiment because the drive is switched to the pulse drive at low speed to stop the lens housing.

The present invention is not limited to the above embodiment, but may include a variety of changes and modifications. For example, the present embodiment was explained as a unifocal camera which is focus-adjusted at a point of the focal length setting position (third position 36), but the present invention can also be applied to cameras with a plurality of focal length setting positions (for example, a standard shot position and a telephoto shot position), such as cameras with zoom function. Further, the present embodiment is arranged to drive the motor 20 by the two types of controls, the dc control and pulse control, but all drive may be arranged to rely on the pulse control.

As detailed above, the drive control apparatus of lens housing for camera according to the present invention is so arranged that signals generated by the signal generating means are those changing their states depending upon the positional relation of the lens housing relative to the single reference position. Then the control apparatus according to the present invention executes the movement control of the lens housing, based upon only the signals. Thus, the position detection of the lens housing is carried out only at the single reference position, and in each processing for moving the lens housing by the control unit and drive unit, the control for moving the lens housing to the first, second, or third position by the reference of this reference position is carried out after the lens housing is once moved to the reference position to execute position detection.

Since the present invention includes control of the lens housing based on the position detection of lens housing at the single reference position, a possibility of occurrence of detection error is lower than those with the conventional drive control apparatus requiring the position detection at at least three positions. Further, because only a signal line is enough for the signals generated by the signal generating means, the number of input ports of CPU can be curtailed.

Accordingly, the drive control apparatus of lens housing for camera according to the present invention can always move the lens housing to accurate positions throughout a long period even if there are a plurality of projecting positions of the lens housing to be position-detected (for example, the standby position and focusing position).

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 255449/1994 filed on Oct. 20, 1994 is hereby incorporated by reference.

What is claimed is:

1. A drive control apparatus of lens housing for camera, comprising:

a camera body having a front panel in which an aperture is formed;

a lens housing comprising lenses, at least a part of said lens housing being disposed in said aperture, the lens housing including a front face;

a drive unit for moving said lens housing between a first position where the lens housing is substantially retracted inside said camera body, a second position where the front face of said lens housing is projected out of said camera body, and a third position where the front face of said lens housing is further projected from said second position out of the camera body;

signal generating means for outputting one signal which holds a first level when said lens housing is located on a side of said first position with respect to a single reference position and another signal which holds a second level when said lens housing is located on a side of said third position with respect to said single reference position; and a control unit connected to said drive unit and said signal generating means, said control unit driving said drive unit in such a manner that in moving said lens housing from said first position to said second position, said lens housing is moved in a projecting direction until said signal of the first level is switched to the signal of the second level, said lens housing is further moved by a predetermined distance in the projecting direction, said lens housing is further moved in a returning direction until said signal of the second level is switched to the signal of the first level, and said lens housing is further moved in the returning direction by a distance of from said reference position to said second position, that in moving said lens housing from said second position to said third position, said lens housing is moved in the projecting direction until said signal of the first level is switched to the signal of the second level, and said lens housing is further moved in the projecting direction by a distance of from said reference position to said third position, that in moving said lens housing from said third position to said second position, said lens housing is moved in the returning direction until said signal of the second level is switched to the signal of the first level, and said lens housing is further moved in the returning direction by the distance of from said reference position to said second position, and that in moving said lens housing from said second position to said first position, said lens housing is moved in the projecting direction until said signal of the first level is switched to the signal of the second level, said lens housing is further moved by a predetermined distance in the projecting direction, said lens housing is further moved in the returning direction until said signal of the second level is switched to the signal of the first level, and said lens housing is moved in the returning direction by a distance of from said reference position to said first position.

2. The apparatus according to claim 1, wherein said single reference position is defined at a predetermined position between said first position and said third position.

3. The apparatus according to claim 1, wherein said single reference position is defined at a predetermined position between said second position and said third position.

4. The apparatus according to claim 1, wherein said control unit drives said drive unit in such a manner that said lens housing is moved from one position among the first, second and third positions to said single reference position based upon said signal of the first level, and then said lens housing is further moved from said single reference position to another position among the first, second and third positions by a predetermined distance of from said single reference position to said another position.

5. The apparatus according to claim 4, wherein said control unit drives said drive unit in such a manner that said lens housing is moved from said one position to said single reference position by dc control, and then said lens housing is further moved from said single reference position to said another position by pulse control.

6. The apparatus according to claim 1, wherein said drive unit moves said lens housing at a first velocity before the level of said signal of the first level is switched, and moves said lens housing at a second velocity lower than said first velocity after the level of said signal of the first level, is switched.

7. The apparatus according to claim 1, wherein said camera body further comprises a camera power-supply switch and a shutter release button and wherein said power-supply switch and shutter release button are connected to said control unit; and wherein said control unit drives said drive unit in such a manner that when said power-supply switch is in an off state, said lens housing is located at said first position, that when said power-supply switch is in an on state and when said shutter release button is in a standby state in which said shutter release button is not depressed, said lens housing is located at said second position, and that when said power-supply switch is in the on state and when said shutter release button is in a photographing state in which said shutter release button is depressed, said lens housing is located at said third position.

* * * * *